United States Patent
Kolli et al.

(10) Patent No.: US 10,817,389 B2
(45) Date of Patent: Oct. 27, 2020

(54) FAILURE-ATOMIC PERSISTENT MEMORY LOGGING USING BINARY TRANSLATION

(71) Applicant: VMware, Inc., Palo Alto, CA (US)

(72) Inventors: Aasheesh Kolli, Santa Clara, CA (US); Irina Calciu, Palo Alto, CA (US); Jayneel Gandhi, Sunnyvale, CA (US); Pratap Subrahmanyam, Saratoga, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/256,567

(22) Filed: Jan. 24, 2019

(65) Prior Publication Data

US 2020/0241978 A1 Jul. 30, 2020

(51) Int. Cl.
*G06F 11/14* (2006.01)

(52) U.S. Cl.
CPC ...... *G06F 11/1471* (2013.01); *G06F 11/1448* (2013.01); *G06F 11/1474* (2013.01)

(58) Field of Classification Search
CPC ............ G06F 11/1471; G06F 11/1484; G06F 11/1474

USPC ........................................................ 711/162
See application file for complete search history.

(56) References Cited

U.S. PATENT DOCUMENTS 10,445,238 B1 * 10/2019 Diestelhorst .......... G06F 9/4401

* cited by examiner

*Primary Examiner* — Hua J Song
(74) *Attorney, Agent, or Firm* — Patterson + Sheridan, LLP (57) ABSTRACT

A module for rewriting application code as a failure-atomic transaction is disclosed. An application delineates a code fragment that is to become a failure-atomic transaction by writing a tx_begin( ) and tx_end( ) functions into its code. A module detects the tx_begin( ) and tx_end( ) functions and rewrites the code fragment as a failure-atomic transaction. The rewritten code is then available to be executed by the application. The rewritten code stores values and locations of stores to persistent memory locations so that the transaction can be either undone or redone in the case of an application error or a power failure. If the transaction is an undo type of transaction, the application can be rolled back to a state prior to the failure. If the transaction is a redo type of transaction, the application can be advanced to a correct state after the error.

23 Claims, 13 Drawing Sheets

FIG. 9

FAILURE-ATOMIC PERSISTENT MEMORY LOGGING USING BINARY TRANSLATION

BACKGROUND

Persistent memory, in the memory/storage hierarchy, resides between system memory and mass storage. Persistent memory is a type of memory that holds its content across power cycles, is byte-addressable, and in some cases has about nine times the density of DRAM. With latencies in the nanosecond range, persistent memory is fast enough to be connected to the memory bus of the CPU as part of main memory so that the CPU can access the data directly rather than perform block I/O operations to buffers for mass storage.

Failure-atomicity means that all the data modifications, such as writes to persistent memory, performed within an atomic transaction (e.g., identified by a programmer using 'tx_begin' and 'tx_end' functions) will persist atomically, i.e., either all or none of the data modifications will be visible/realized once the system recovers from a failure (e.g., power failure). Achieving failure-atomicity is usually accomplished with logging, such as either undo or redo logging. However, implementing logging mechanisms is challenging and error-prone. Errors in logging could result in an application's persistent data being corrupted.

It is desirable to improve failure-atomicity using persistent memory.

SUMMARY

Embodiments include a method for rewriting application code as a failure-atomic transaction. The method includes detecting a portion of application code declared to be a transaction, accumulating instructions in the portion of application code into a code fragment, rewriting the code fragment as a failure-atomic transaction, where the code of the rewritten fragment includes a beginning mark for the transaction, code that saves the locations and values of persistent store operations in the application code, and an ending mark for the transaction, releasing the rewritten code to the application for execution.

Further embodiments include a computer-readable medium containing instructions for carrying out one or more aspects of the above method, and a system configured to carry out one or more aspects of the above method.

An advantage is that automated logging removes the burden of ensuring crash consistency from the application programmer.

DETAILED DESCRIPTION

Embodiments described herein provide a facility for an application to mark a portion of its code as a transaction that can be undone or redone. Having this facility means that if the application fails or encounters a runtime error, the application can undo the transaction to recover the state of the application before the failure or error or redo the transaction to establish a correct state of the transaction after the error. This facility makes the application more robust and lessens the likelihood that an application will lose or corrupt data. Additionally, storing the transaction in persistent memory assures that the transaction is preserved over events that require reloading of traditional volatile memory and even power interruptions.

Figure 1A:
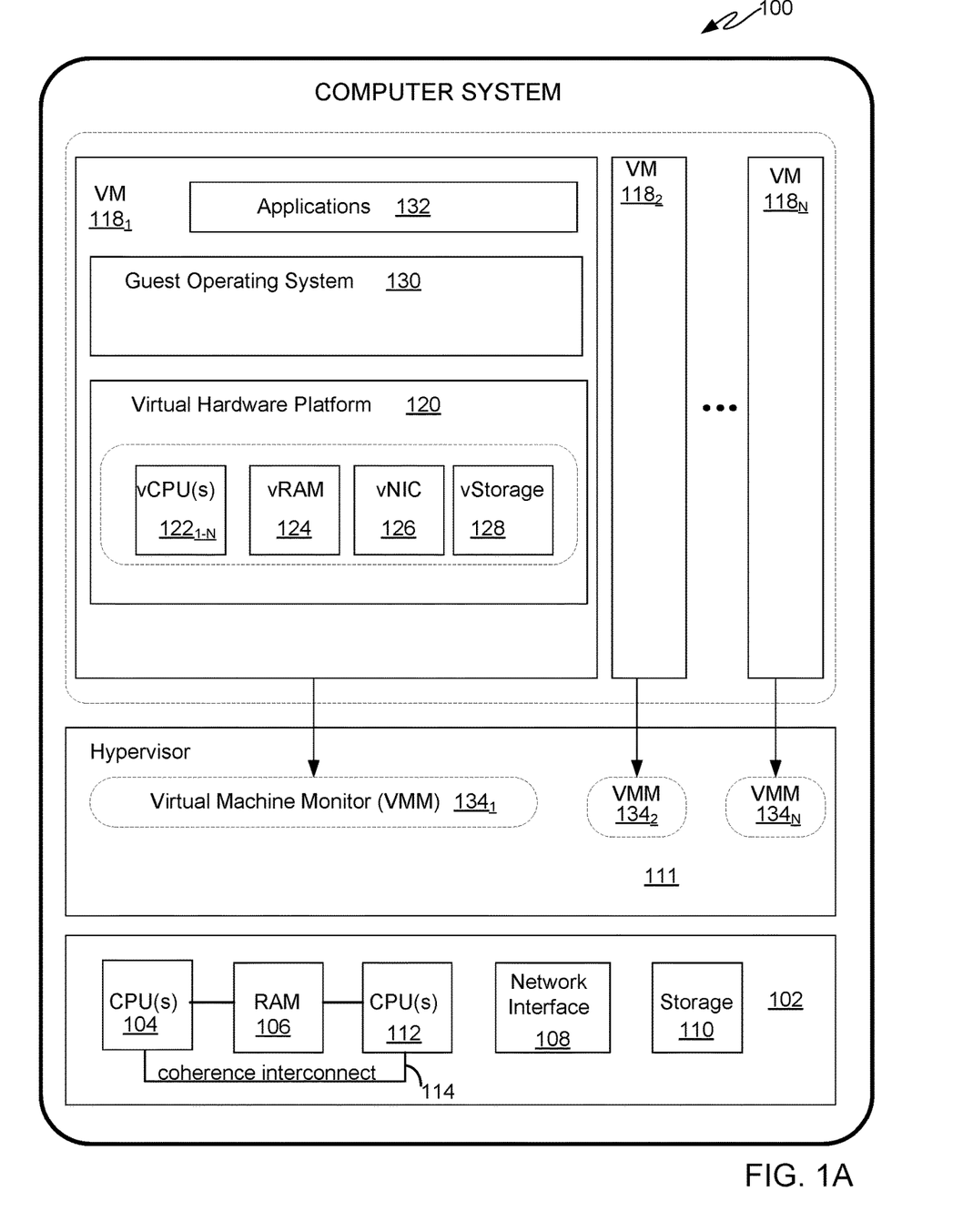
FIG. 1A depicts a block diagram of a computer system that is representative of a virtualized computer architecture in which embodiments may be implemented.

FIG. 1A depicts a block diagram of a computer system 100 that is representative of a virtualized computer architecture in which embodiments may be implemented. As is illustrated, computer system 100 hosts multiple virtual machines (VMs) $118_1$-$118_N$ that run on and share a common hardware platform 102. Hardware platform 102 includes conventional computer hardware components, such as one or more items of processing hardware such as central processing units (CPUs) 104, 112, a point-to-point coherence interconnect 114 between processors, such as the Intel® UltraPath Interconnect (UPI), which is a successor to the Intel® QuickPath Interconnect (QPI), which supports a cache coherence protocol, a random access memory (RAM) 106, one or more network interfaces 108, and persistent storage 110.

A virtualization software layer, referred to hereinafter as hypervisor 111, is installed on top of hardware platform 102. Hypervisor 111 makes possible the concurrent instantiation and execution of one or more VMs $118_1$-$118_N$. The interaction of a VM 118 with hypervisor 111 is facilitated by corresponding virtual machine monitors (VMMs) 134. Each VMM $134_1$-$134_N$ is assigned to and monitors a corresponding VM $118_1$-$118_N$. In one embodiment, hypervisor 111 may be a hypervisor implemented as a commercial product in VMware's vSphere® virtualization product, available from VMware Inc. of Palo Alto, Calif. In an alternative embodiment, hypervisor 111 runs on top of a host operating system which itself runs on hardware platform 102. In such an embodiment, hypervisor 111 operates above an abstraction level provided by the host operating system.

After instantiation, each VM $118_1$-$118_N$ encapsulates a physical computing machine platform that is executed under the control of hypervisor 111. Virtual devices of a VM 118 are embodied in the virtual hardware platform 120, which is comprised of, but not limited to, one or more virtual CPUs (vCPUs) $122_1$-$122_N$, a virtual random access memory (vRAM) 124, a virtual network interface adapter (vNIC) 126, and virtual storage (vStorage) 128. Virtual hardware platform 120 supports the installation of a guest operating system (guest OS) 130, which is capable of executing applications 132. Examples of a guest OS 130 include any of the well-known commodity operating systems, such as the Microsoft Windows® operating system, and the Linux® operating system, and the like.

It should be recognized that the various terms, layers, and categorizations used to describe the components in FIG. 1A may be referred to differently without departing from their functionality or the spirit or scope of the disclosure. For example, VMMs $134_1$-$134_N$ may be considered separate virtualization components between VMs $118_1$-$118_N$ and hypervisor 111 since there exists a separate VMM for each instantiated VM. Alternatively, each VMM may be considered to be a component of its corresponding virtual machine since such VMM includes the hardware emulation components for the virtual machine. In such an alternative conception, for example, the conceptual layer described as virtual hardware platform 120 may be merged with and into VMM 134. Further, though certain embodiments are described with respect to VMs, the techniques described herein may similarly be applied to other types of virtual computing instances, such as containers.

Figure 1B:
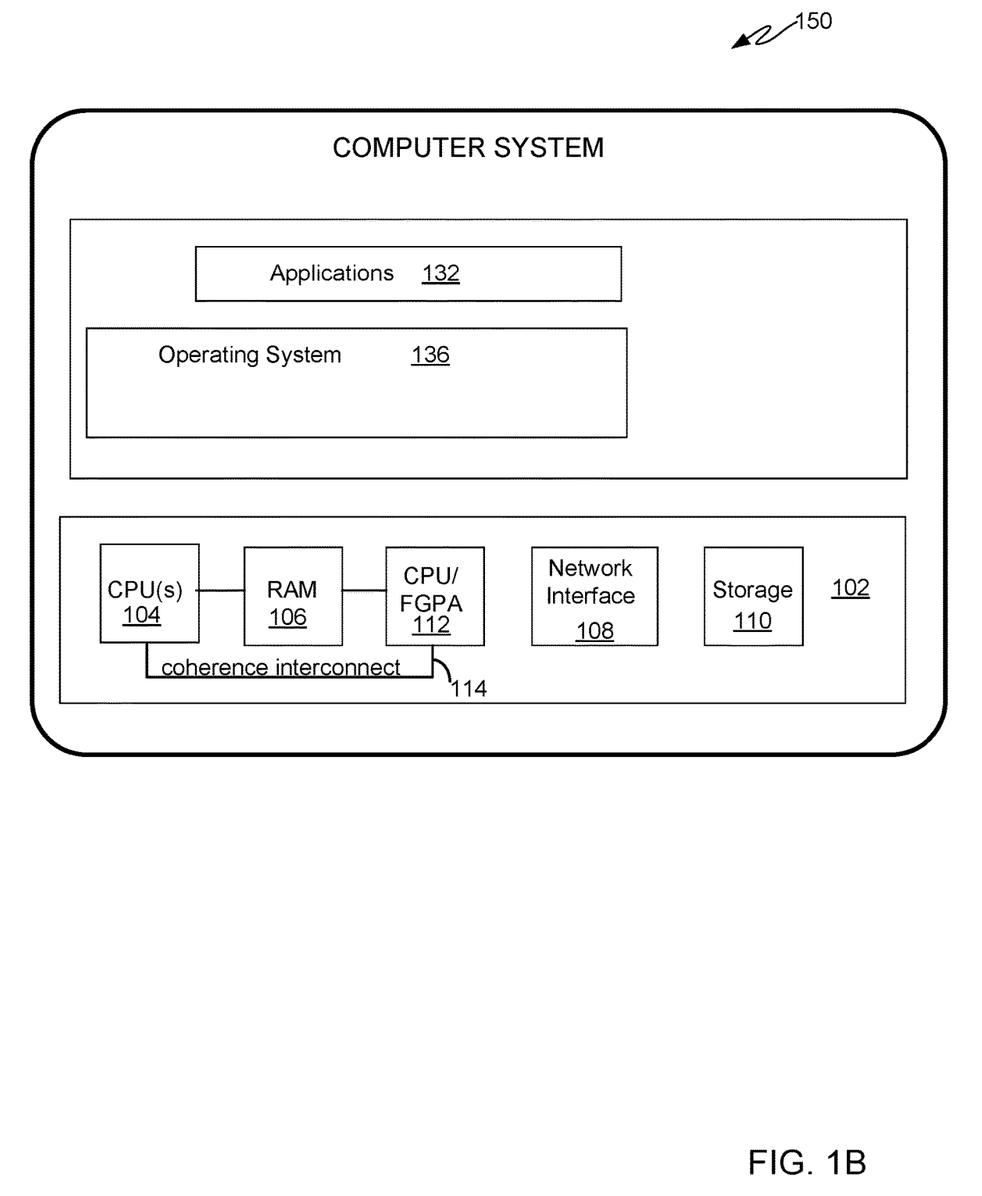
FIG. 1B depicts a block diagram of a computer system that is representative of an alternative computer architecture in which embodiments may be implemented.

FIG. 1B depicts a block diagram of a computer system 150 that is representative of an alternative computer architecture in which embodiments may be implemented. As is illustrated, and similar to the hardware platform depicted in FIG. 1A, hardware platform 102 includes conventional computer hardware components, such as one or more items of processing hardware such as central processing units (CPUs) 104, 112, a point-to-point coherence interconnect 114 between processors, such as the Intel® UltraPath Interconnect (UPI), which is a successor to the Intel® QuickPath Interconnect (QPI), which supports a cache coherence protocol, a random access memory (RAM) 106, one or more network interfaces 108, and persistent storage 110.

Hardware platform 120 supports the installation of an operating system (OS) 136, which is capable of executing applications 132. Examples of the OS 136 include any of the well-known commodity operating systems, such as the Microsoft Windows® operating system, and the Linux® operating system, and the like.

Figure 2:
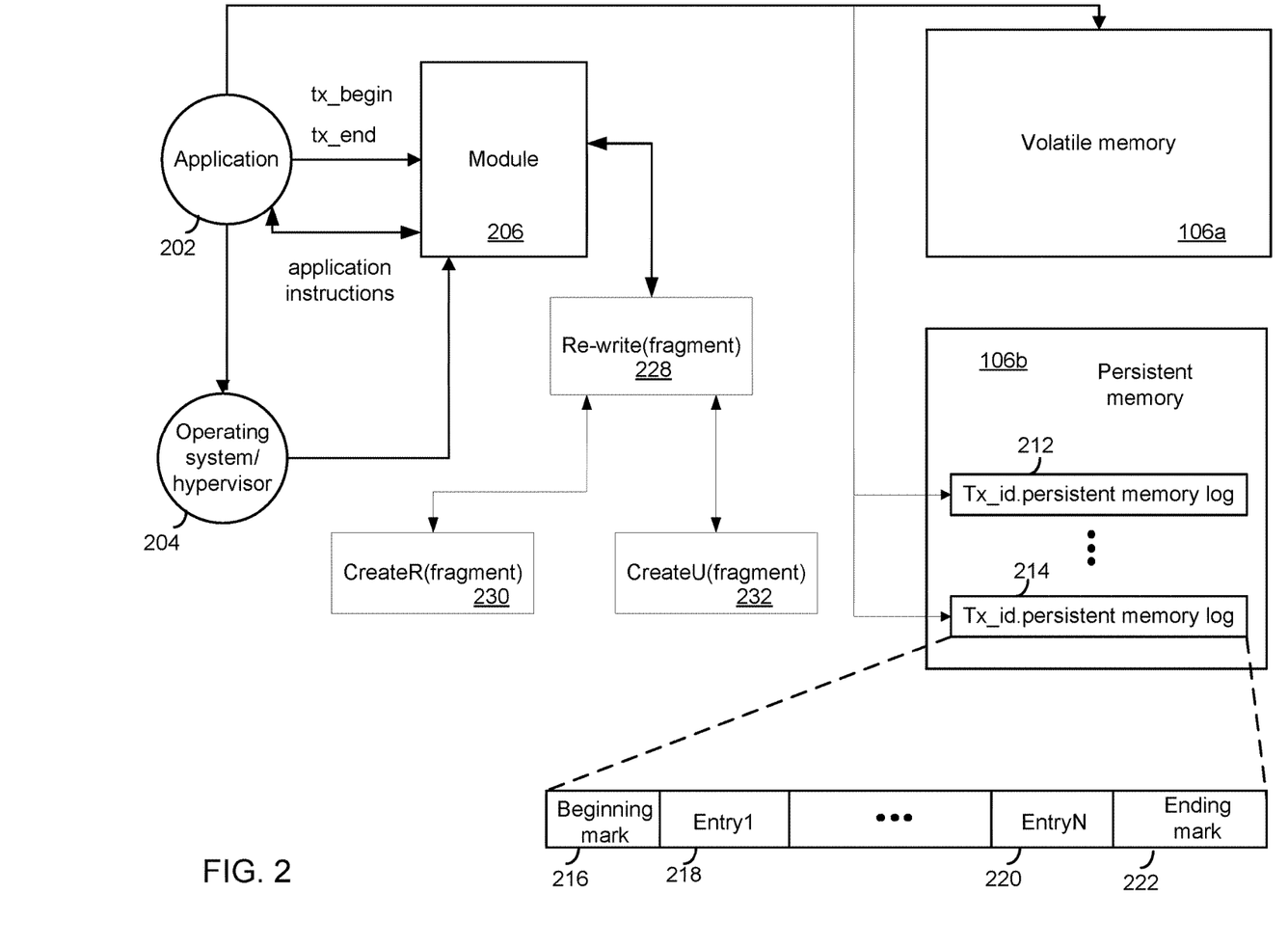
FIG. 2 depicts a diagram of the modules and functions in an embodiment.

FIG. 2 depicts a diagram of the modules and functions for rewriting code fragments of the application into a failure-atomic transaction, in an embodiment. The modules and functions include an Application 202 (e.g., corresponding to an Application 132 of FIG. 1A), an operating system or hypervisor 204 (e.g., corresponding to a hypervisor 111 of FIG. 1A or an operating system in FIG. 1B), a Module 206, such as a binary translator, Volatile memory 106a, such as dynamic RAM, a Persistent memory 106b, a Re-write (fragment) function 228 described in more detail in reference to FIG. 5, a CreateR(fragment) function 230 described in more detail in reference to FIGS. 6A, 6B, and a CreateU (fragment) function 232 described in more detail in reference to FIGS. 7A, 7B. In one embodiment, Module 206 is part of Operating system/hypervisor 204. Persistent memory 106b includes one or more persistent memory logs 212-214. Each of the one or more persistent memory logs 212-214 has a format that includes a beginning mark 216, a sequence of entries 218-220, and an ending mark 222. Different persistent memory logs 212-214 can be distinguished by a transaction id (tx_id).

Modules and functions depicted in embodiments herein may communicate with each other by sending and receiving messages without being involved in the underlying communications media. In particular, a step 'Send(msg to dest)' is an asynchronous non-blocking transmission of a message, msg, to a destination, dest, and a step, 'Received(msg)' is a predicate, which if true is interpreted as signaling that a message has been received. If the predicate is false, no message has been received, and the function or module is blocked waiting for a message to arrive. However, the function or module can configure the predicate so that by testing the predicate, the function or module can avoid being blocked. Embodiments described herein are not limited by any specific form or method of receiving messages. Any kind of messaging technique can be used in which messages are sent and received in structures such as shared memory locations, FIFOs or mailboxes.

Figure 3:
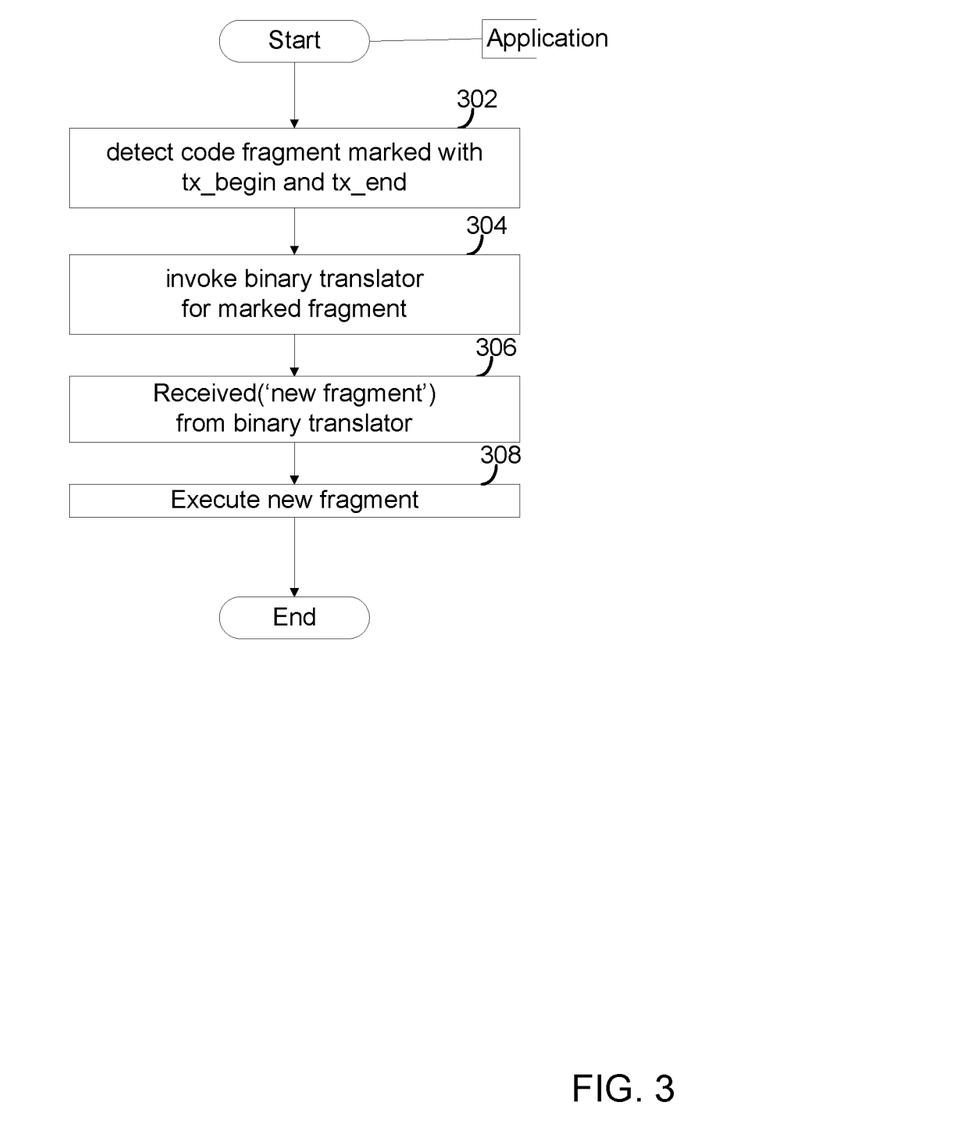
FIG. 3 depicts a flowchart for an application whose activity can become a transaction, in an embodiment.

FIG. 3 depicts a flowchart for an application whose activity can become a transaction, in an embodiment. In step 302, Application 202 detects a code fragment marked with a tx_begin( ) and tx_end( ) function by a programmer. The code that is to be executed as a transaction resides between these functions. In step 304, Application 202 requests or causes Module 206, such as a binary translator, to re-write the marked fragment. In step 306, Application 202 receives a new fragment (i.e., a fragment rewritten by Module 206) and in step 308, Application 202 executes the new fragment, thereby making the portion of the application code become a failure-atomic transaction that can be undone or redone.

Figure 4:
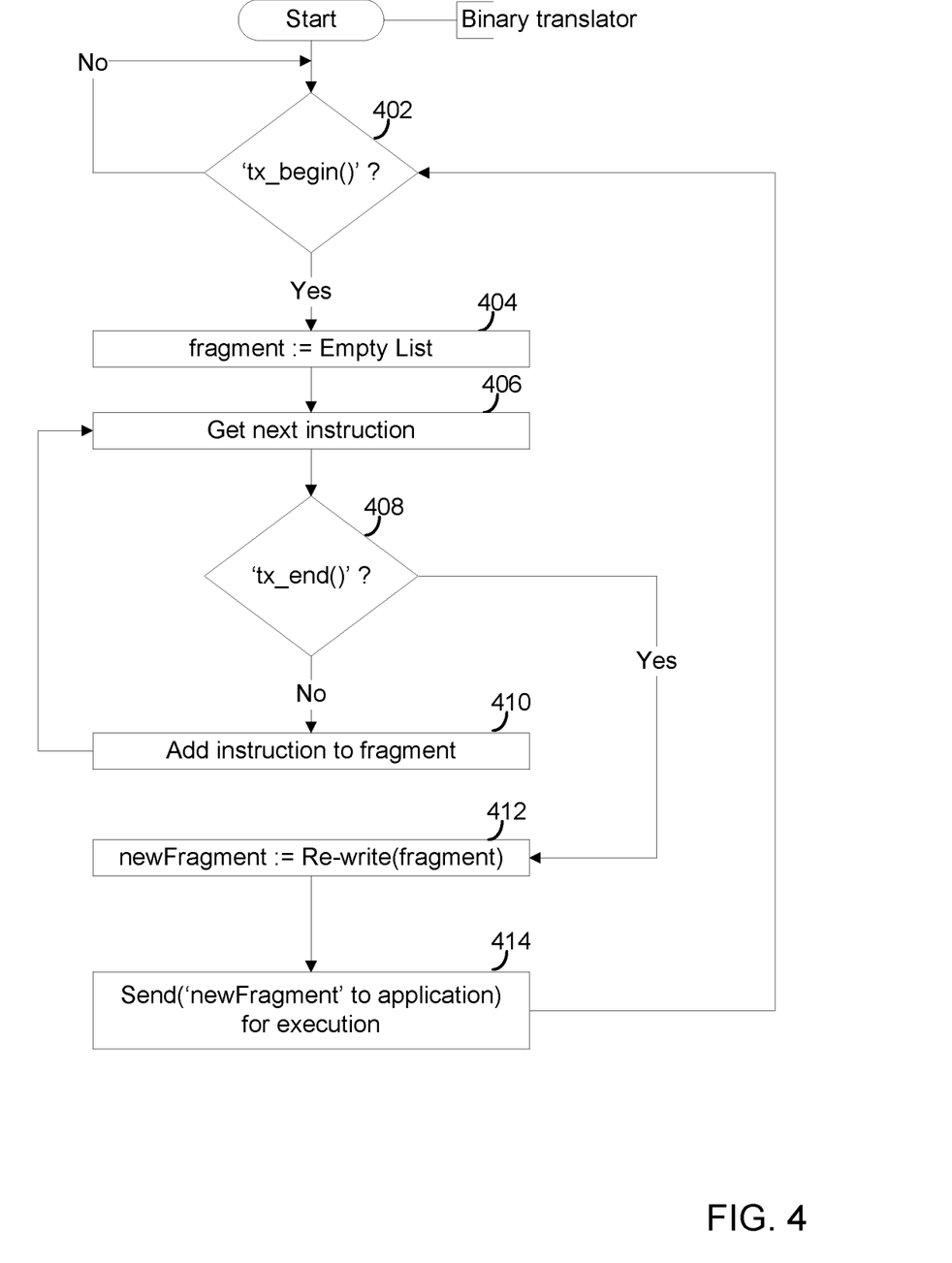
FIG. 4 depicts a flowchart of operations performed by a module, such as a binary translator, in an embodiment.

FIG. 4 depicts a flowchart of operations performed by a module, such as a binary translator, in an embodiment. In step 402, Module 206 detects a 'tx_begin( )' function in the code of Application 202. In step 404, Module 206 initializes a new fragment as an empty list and in step 406 inspects each instruction after the 'tx_begin( )' function. If the instruction is not a tx_end( ) function as determined in step 408, then in step 410, Module 206 adds the instruction to the fragment. In this manner, Module 206 accumulates instructions into the fragment. Upon detecting that the next instruction obtained in step 406 is a tx_end( ) function, then Module 206 ends the accumulation and calls Re-write(fragment, U, R) function 228 in step 412, where 'U' indicates an undo type of transaction, and 'R' indicates a redo type of transaction. Upon the return of Re-write(fragment, U, R) function 228 in step 412, Module 206 has a new fragment which it sends to Application 202 for execution in step 414. Executing the re-written code turns the selected portion of code in Application 202 into a transaction that can be undone or redone. In one embodiment, Module 206 resides in hypervisor 111 in FIG. 1A or in an operating system, such as Linux® or Windows®, in the representative computer system of FIG. 1B.

Figure 5:
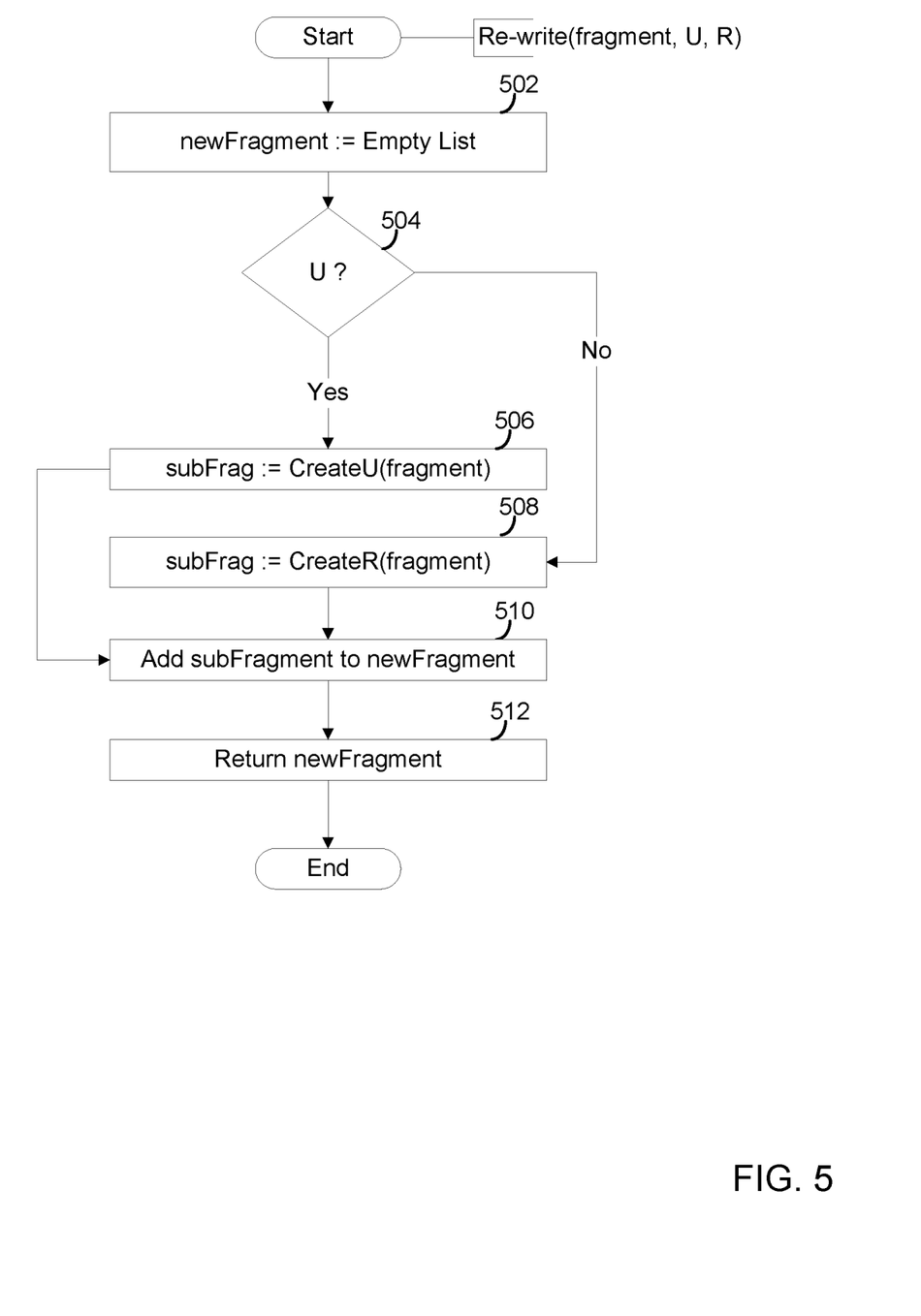
FIG. 5 depicts a flowchart of operations performed by the re-write fragment function, in an embodiment.

FIG. 5 depicts a flowchart of operations performed by the Re-write(fragment, U, R) function, in an embodiment. In step 502, function 228 creates an empty new fragment, and in step 504, function 228 determines whether the new fragment is for an undo type transaction or a redo type transaction. If the new fragment is for an undo type transaction, then in step 506, function 228 calls CreateU(fragment) function 232, which returns a new sub-fragment and is further described in reference to FIGS. 7A and 7B. If the new fragment is for a redo type transaction, then in step 508, function 228 calls CreateR(fragment) function 230, which returns a new sub-fragment and is further described in reference to FIGS. 6A and 6B. In step 510, function 228 adds the returned new sub-fragment to the new fragment and in step 512 returns the new fragment to Module 206.

Figure 6A:
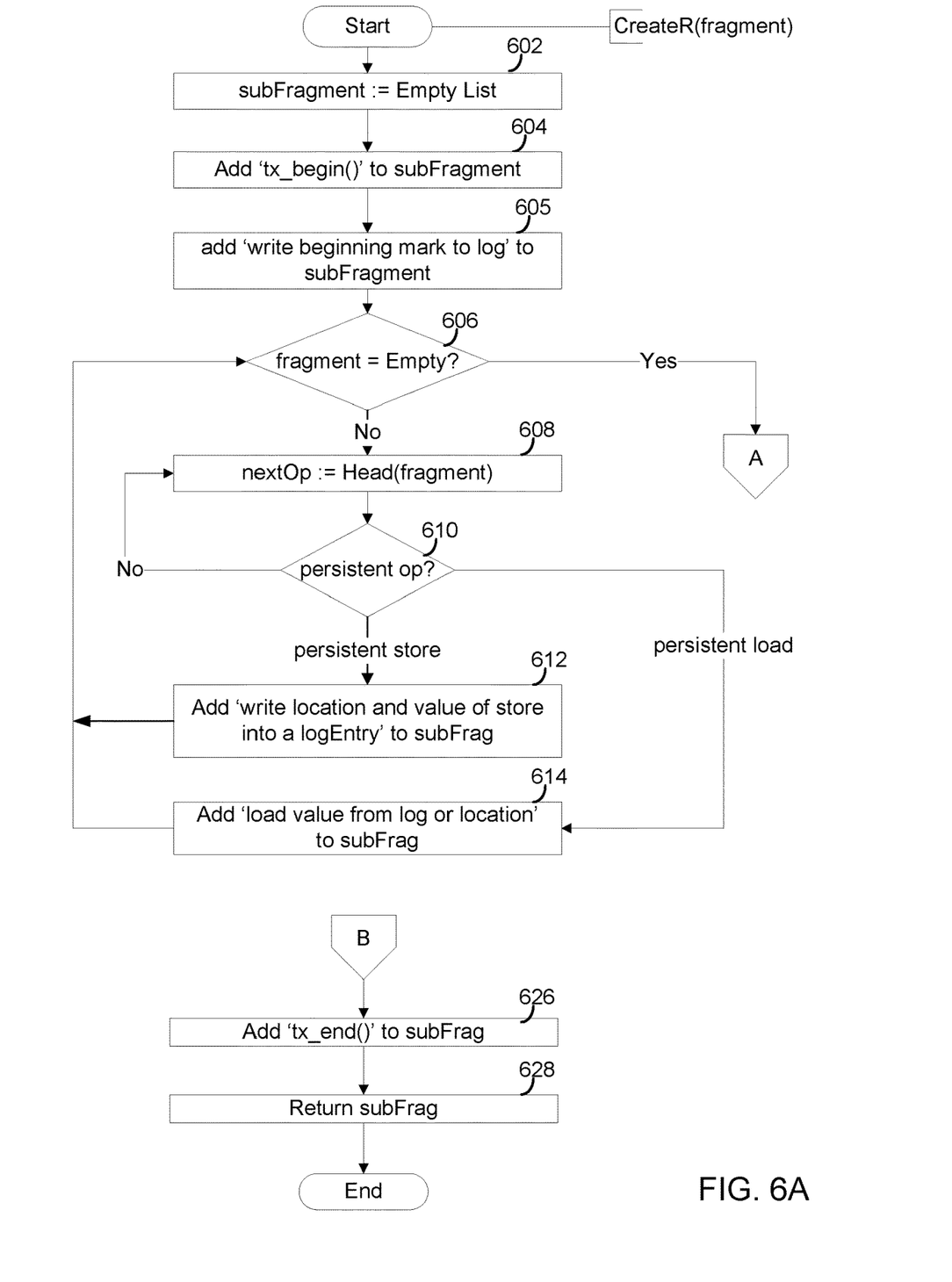
FIG. 6A depicts a flowchart of operations performed by the createR function, in an embodiment.

FIG. 6A depicts a flowchart of operations performed by the CreateR(fragment) function, in an embodiment. In step 602, function 230 creates an empty new sub-fragment. In step 604, function 230 adds a 'tx_begin( )' function to the sub-fragment. In step 605, function 230 adds a 'write beginning mark to the log'. In step 606, function 230 determines whether or not the fragment it is rewriting is an empty list (which is not empty in the first iteration). If not, then in step 608, function 230 removes the operation, nextOp, at the head of the fragment. In step 610, function 230 determines whether nextOp is a persistent operation (i.e., whether it is a load or store operation specifying a persistent memory location). If not, then function 230 ignores nextOp and gets the next operation in step 608. If nextOp is a persistent store operation, then in step 612, function 230 adds an operation 'write location and value of store to a log Entry' to the sub-fragment, where the value is the value in the persistent store instruction to be stored at the location specified by the store instruction. If, in step 610, function 230 determines that nextOp is a persistent load instruction, then function 230 adds in step 614 an operation 'load from log or location' to the sub-fragment. Specifically, 'load from log' is added if the log contains the most recent load data. Otherwise, 'load from location' is added. If, in step 606, function 230 determines that there are no more operations in the fragment (i.e., the fragment is empty), then function 230 continues to step 616 of FIG. 6B. In step 616, function 230 adds a 'writeBack(log Entry)' function to the sub-fragment for each log Entry with a persistent store in the sub-fragment. The writeBack(log Entry) function is described in reference to FIG. 8A. In step 618, function 230 adds an 'sfence' instruction to the sub-fragment. The 'sfence' instruction is a barrier instruction that guarantees that operations issued before the barrier are finished before operations issued after the barrier. In step 620, function 230 adds a 'commit_log( )' function to the sub-fragment. The 'commit_log( )' function is described in reference to FIG. 8B. In step 622, function 230 adds a 'replay_log( )' function to the sub-fragment. The 'replay_log( )' function is described in reference to FIG. 8C. In step 624, adds a 'persist_write-set( )' function to the sub-fragment. The 'persist_write-set( )' function is described in reference to FIG. 8D. In step 626, function 230 adds function 'tx_end( )' to the sub-fragment and in step 628 returns the sub-fragment to function 228.

Figure 6B:
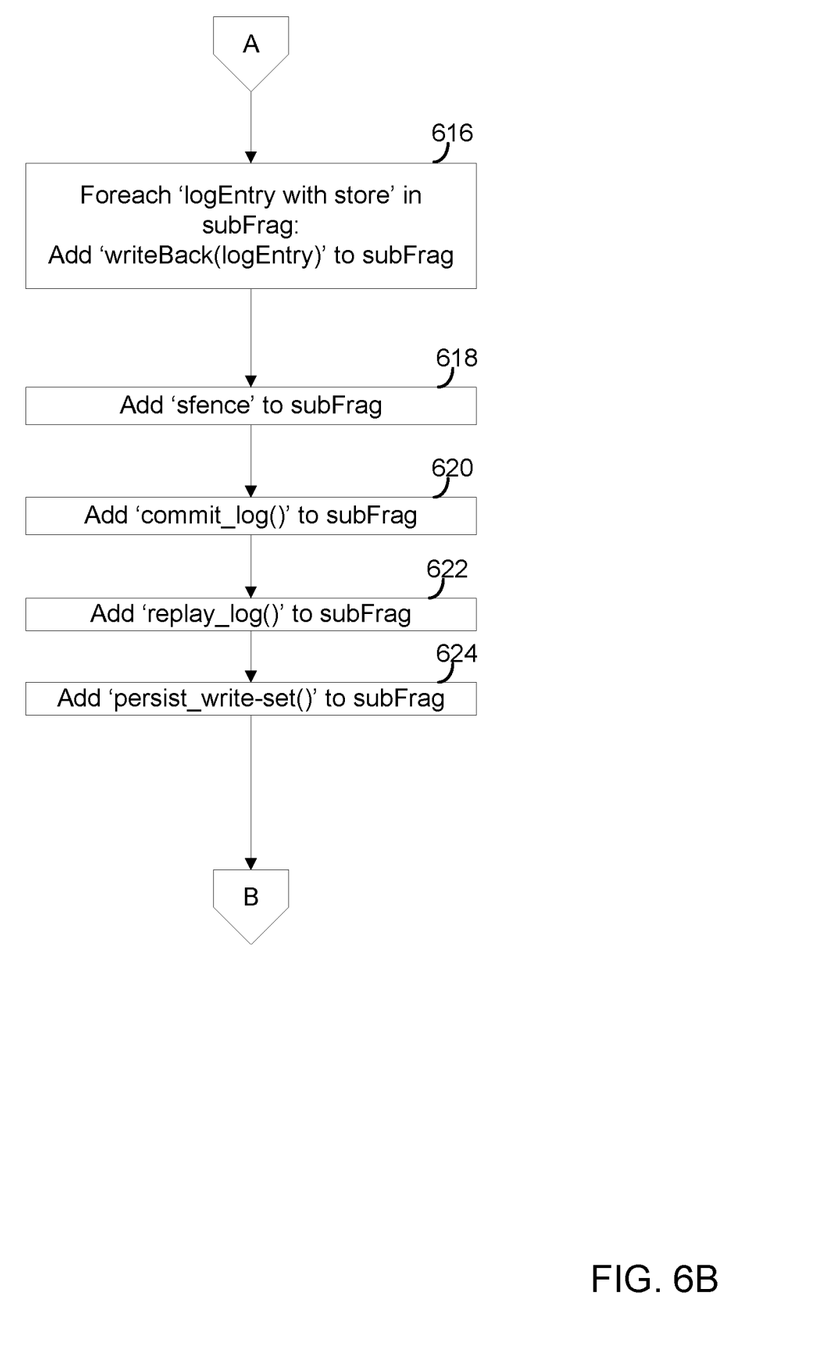
FIG. 6B depicts a flowchart of operations performed by the createR function, in an embodiment.

Table 1 provides an example code fragment from Application 202 and Table 2 provides a rewritten code fragment for a redo transaction according to CreateR(fragment) function 230.

TABLE 1

Original Fragment

| 1 | tx_begin( ) | Begin transaction function |
| 2 | pA := x | Store value to a persistent locationA |
| 3 | y := pA | Load value from a persistent locationA |
| 4 | pB := z | Store value to a persistent locationB |
| 5 | tx_end( ) | End transaction function |

TABLE 2

Rewritten Redo Fragment

| 1 | tx_begin( ) | transaction begin function |
| 2 | write locationA and valueA of store into a logEntryA | log location and value of store op A |
| 3 | load value from logEntryA or from persistent locationA | the most recent value is loaded from either the log entry or from persistent location A |
| 4 | write locationB and valueB of store into a logEntryB | log location and value of store op B |
| 5 | writeBack(logEntryA) | flush cache line containing log entry to persist logEntryA |
| 6 | writeBack(logEntryB) | flush cache line containing log entry to persist logEntryB |
| 7 | sfence | make sure previous operations are completed |
| 8 | commit_log( ) | write end marker to transaction log |
| 9 | replay_log( ) | write locationA and locationB (i.e., the write set) in the redo log to persistent memory |
| 10 | persist_write-set( ) | flush all cache lines that are in the write set |
| 11 | tx_end( ) | transaction end function |

Figure 7A:
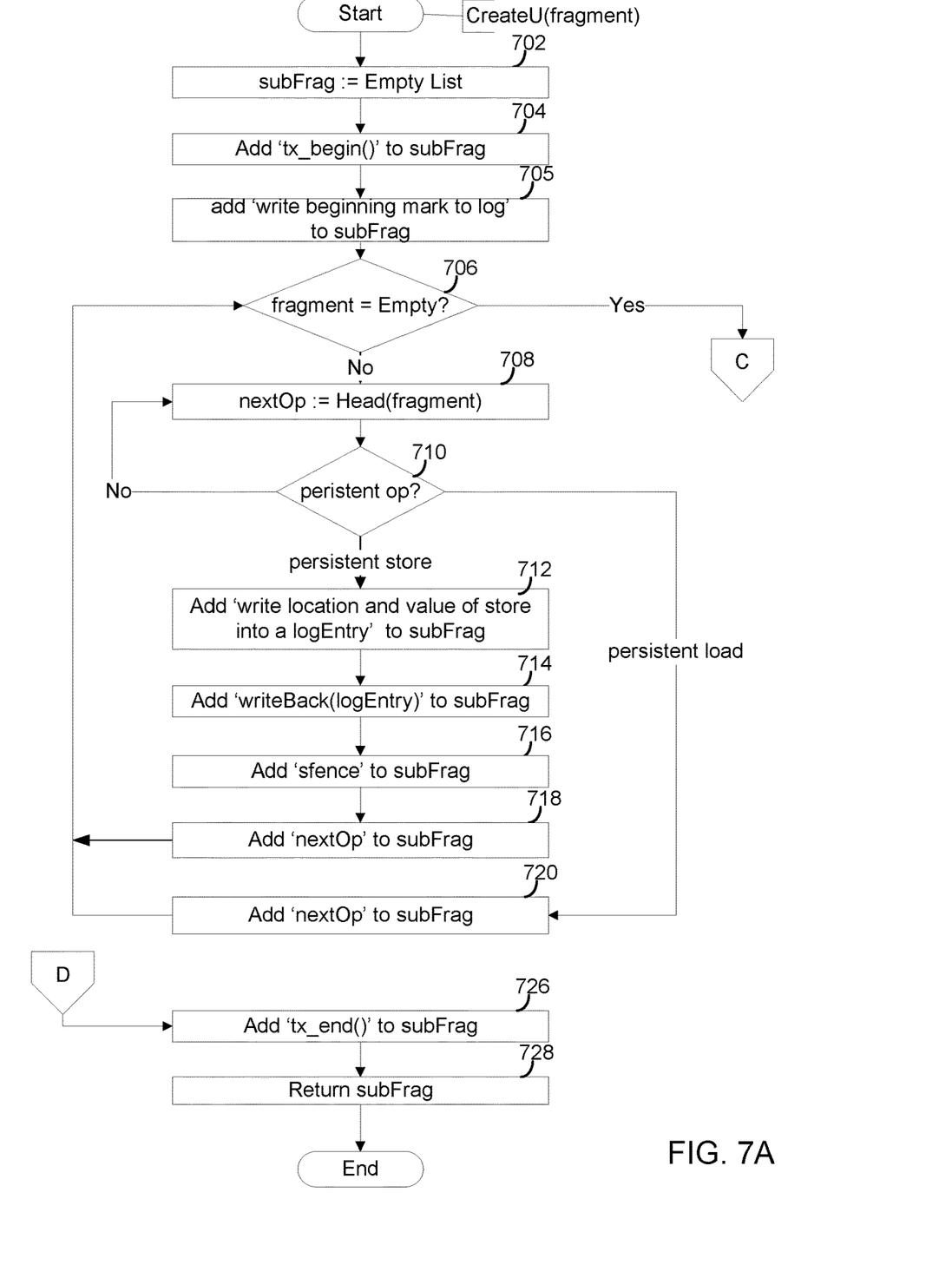
FIG. 7A depicts a flowchart of operations performed by the createU function, in an embodiment.

FIG. 7A depicts a flowchart of operations performed by CreateU(fragment) function, in an embodiment. In step 702, function 232 initializes a new sub-fragment to an empty list. In step 704, function 232 adds a 'tx_begin( )' function to the new sub-fragment. In step 705, function 232 adds a 'write beginning mark to log'. In step 706, function 232 determines whether the given fragment is an empty list. If not, then in step 708, function 232 removes the next operation, nextOp, at the head of the fragment. In step 710, function 232 determines whether nextOp is a persistent operation, such as a load or store specifying a persistent location. If function 232 determines that nextOp is a persistent store then in step 712, function 232 adds 'write location and value of store to a log Entry' to the sub-fragment, where location and value are derived from the original persistent store operation. In step 714, function 232 adds a 'writeBack(log Entry)' function to the sub-fragment. In step 716, function 232 adds 'sfence' to the sub-fragment and in step 718, adds the original operation, 'nextOp', to the sub-fragment. If function 232 in step 710 determines that nextOp is persistent load operation, then function 232 adds in step 720 the original operation, 'nextOp', to the sub-fragment. If function 232 determines in step 706 that the fragment is empty, then in step 722 of FIG. 7B, function 232 adds a 'persist_write-set( )' function to the sub-fragment and in step 724 adds a 'commit_log( )' function to the sub-fragment. In step 726, function 232 adds function 'tx_end( )' to the sub-fragment and returns the sub-fragment to function 228. In one embodiment, function 232 is included as part of Module 206.

Figure 7B:
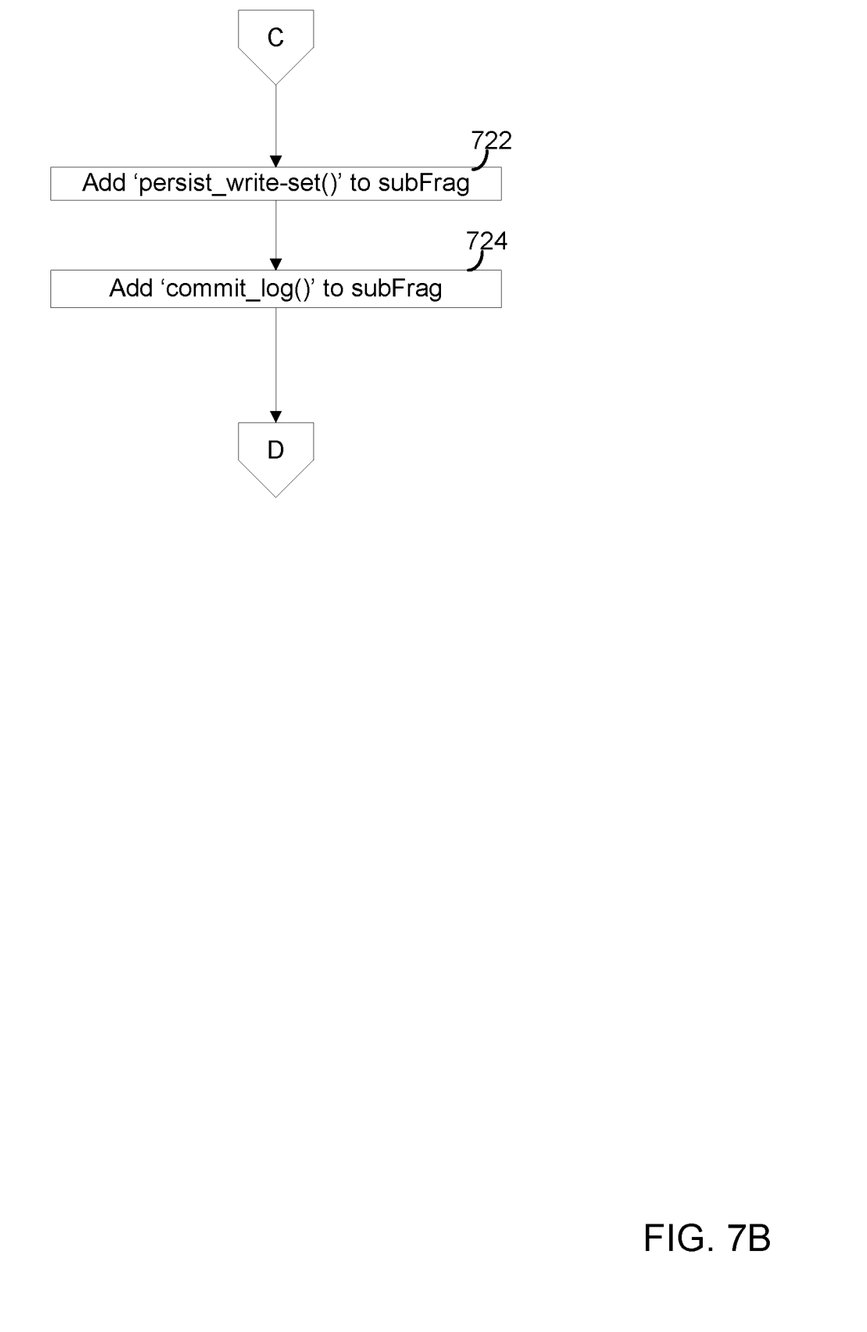
FIG. 7B depicts a flowchart of operations performed by the createU function, in an embodiment.

Table 3 provides a rewritten undo type code fragment for the example code given in Table 1 based on CreateU (fragment) function 230.

TABLE 3

Rewritten Undo Fragment

| 1 | tx_begin( ) | transaction begin function |
| 2 | write locationA and valueA of store into a logEntryA | log location and value of store op A |
| 3 | writeBack(logEntryA) | flush cache line containing logEntryA to persist log entry |

TABLE 3-continued

Rewritten Undo Fragment

| | | |
|---|---|---|
| 4 | sfence | |
| 5 | store value into persistent locationA | original operation |
| 6 | load value from persistent locationA | original operation |
| 7 | write locationB and valueB of store into a logEntryB | log location and value of store op B |
| 8 | writeBack(logEntryB) | flush cache line containing logEntryB to persist log entry |
| 9 | sfence | make sure previous operations are completed |
| 10 | store value to persistent locationB | original operation |
| 11 | persist_write-set( ) | flush all cache lines which are part of the write set (i.e., locationA, locationB) |
| 12 | commit_log( ) | write end marker to transaction log |
| 13 | tx_end( ) | transaction end function |

Figure 8A:
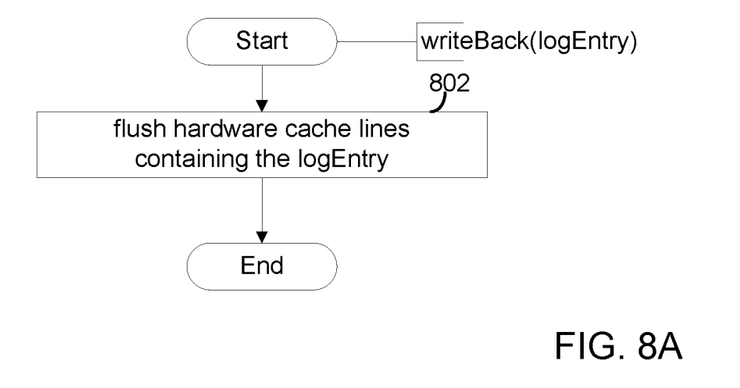
FIG. 8A depicts a flowchart of operations performed by the writeBack(log Entry) function, in an embodiment.

FIG. 8A depicts a flowchart of operations performed by the writeBack(log Entry) function, in an embodiment. In step 802, the writeBack(log Entry) function flushes the hardware cache lines containing the log entry to persist the log entry, where cache line (sometimes called a cache block) generally refers to a block of data of fixed size that is transferred between a memory location and a cache. In addition, when a cache line is copied from memory into a cache, a cache entry is created, which may include the copied data as well as the memory location from which the data was copied (which may be called a tag). In one embodiment, the flush is performed by a CLFLUSH instruction available to CPUs 104. Such an instruction invalidates the cache line that contains the location specified in the instruction. If the location in the caches is dirty, then the cache line is written to memory before the invalidation.

Figure 8B:
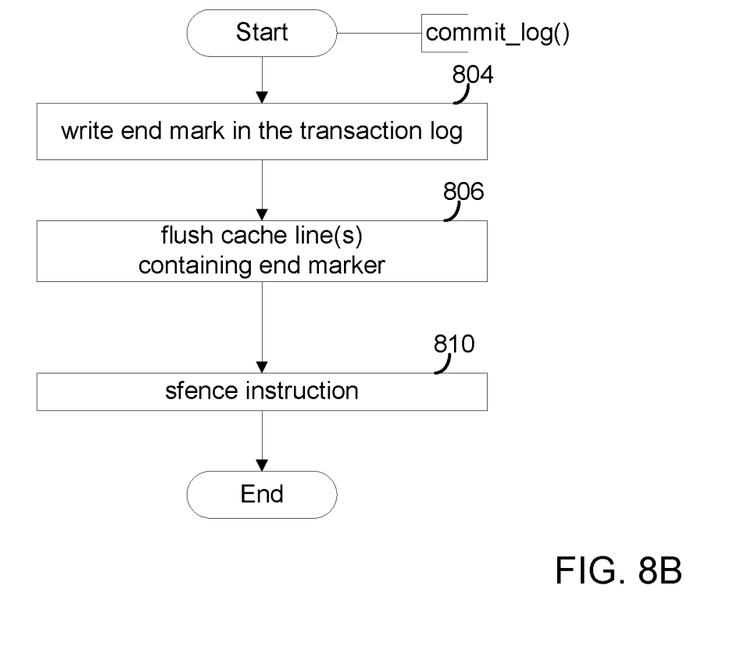
FIG. 8B depicts a flowchart of operations performed by the commit_log( ) function, in an embodiment.

FIG. 8B depicts a flowchart of operations performed by the commit_log( ) function, in an embodiment. In step 804, the function writes the end mark into the transaction log. In step 806, the function flushes the cache line(s) containing the end marker from the caches. In step 810, the function executes a sfence instruction to guarantee that all stores before the sfence instruction are completed before CPU 104 issues any new stores.

Figure 8C:
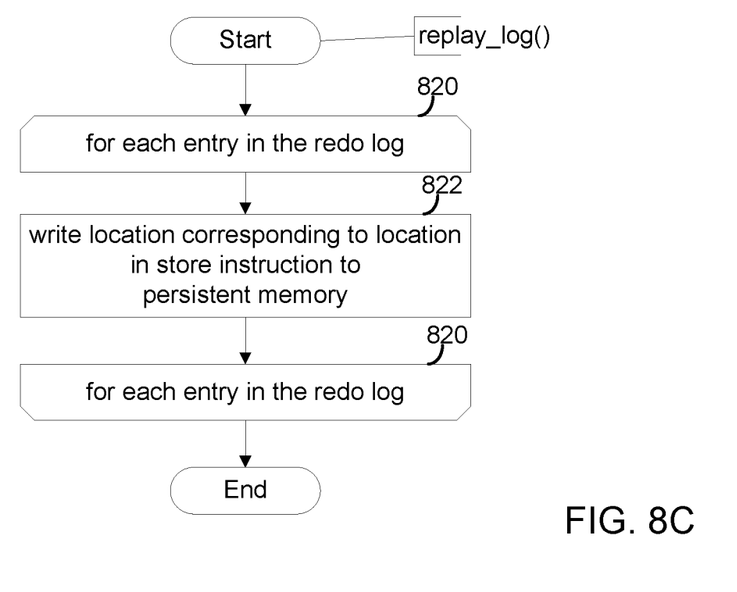
FIG. 8C depicts a flowchart of operations performed by the replay_log( ) function, in an embodiment.

FIG. 8C depicts a flowchart of operations performed by the replay_log( ) function, in an embodiment. In step 820, the function starts an iterator over the entries in the redo log, thereby traversing the entries in the redo log. In step 822, for each entry, the function writes the location that corresponds to the location in the store instruction in the entry to persistent memory.

Figure 8D:
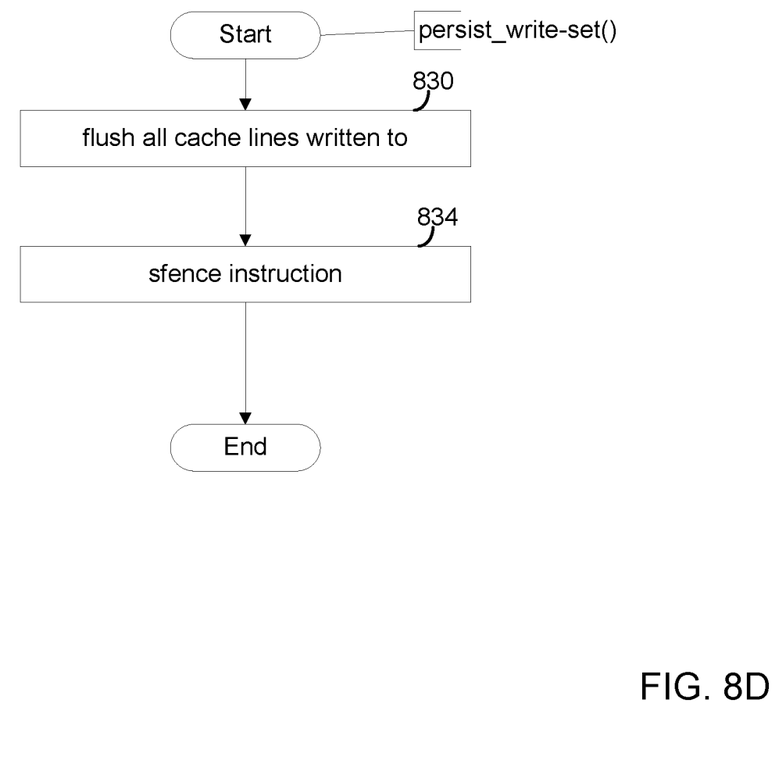
FIG. 8D depicts a flowchart of operations performed by the persist_write-set( ) function, in an embodiment.

FIG. 8D depicts a flowchart of operations performed by the persist_write-set( ) function, in an embodiment. In step 830, the function flushes all cache lines written to in the transaction. In step 834, the function executes a sfence instruction.

Figure 9:
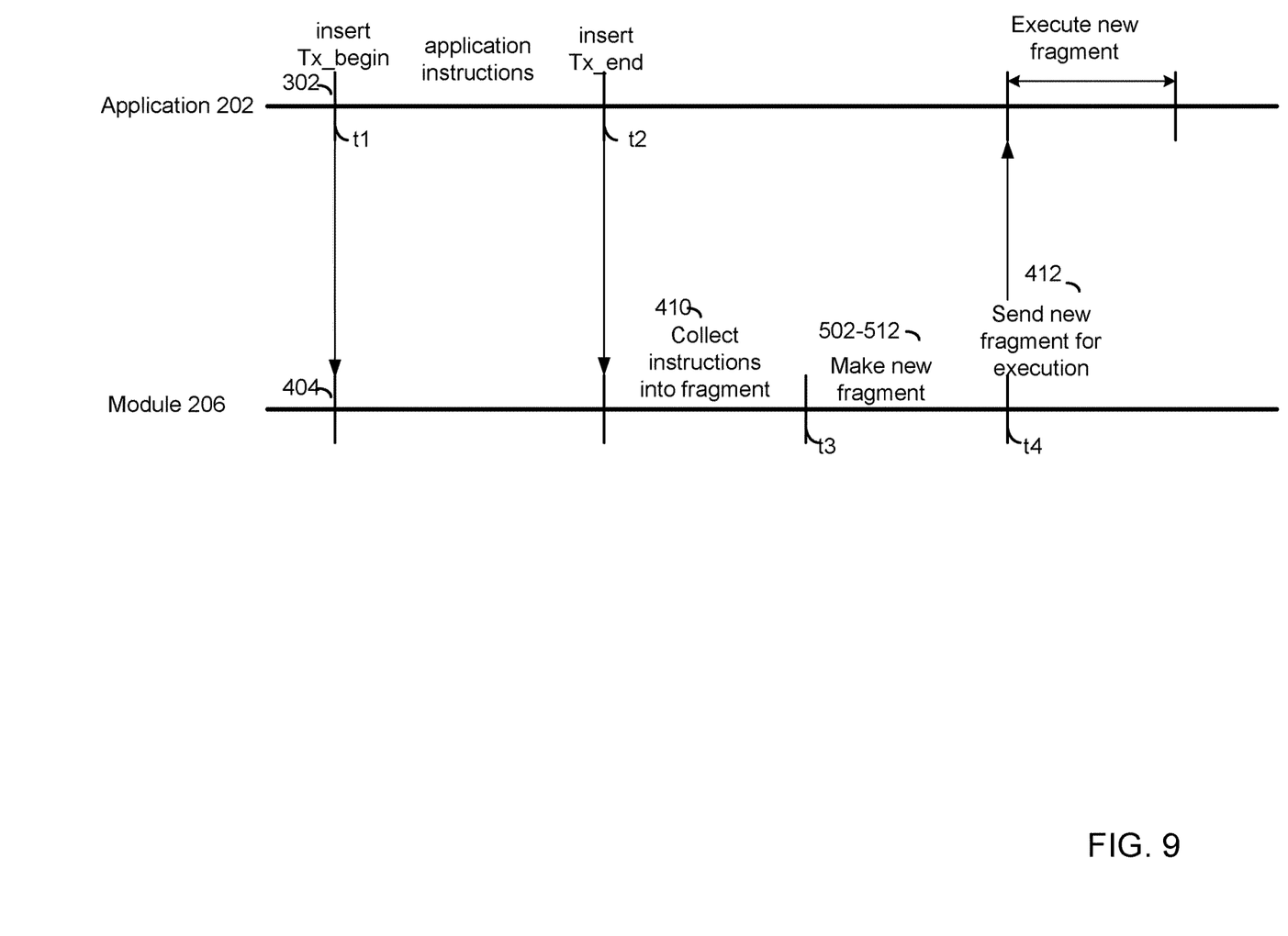
FIG. 9 depicts, in summary form, a timeline for the operations performed by the application and module.

FIG. 9 depicts, in summary form, a timeline for the operations performed by the application and module. At time t1, Application 202 adds a 'tx_begin' function to application code, and at time t2 adds a 'tx_end' function to the application code, thereby delineating a fragment of code as a transaction. Table 1 gives an example of the application code with the tx_begin and tx_end functions. At time t3, Module 206 collects the instructions bracketed by the 'tx_begin' and 'tx_end' functions and at t4 Module 206 rewrites the fragment to create a new fragment for execution by Application 202. Tables 2 and 3 give an example of the rewritten code for a redo or undo type of transaction. At time t4, Application 202 sends the new fragment to Application 202 for execution.

In summary, an application creates a failure-atomic transaction in a portion of its code by adding a tx_begin( ) function and a tx_end( ) function. A module, such as a binary translator, inspects the code of the application in advance of its execution. Upon detection of the 'tx_begin' function, the binary translator examines the code and rewrites the code to create an undo or a redo type of transaction. The rewritten code contains the operations that record values of store operations in transaction log entries so that the transaction can be undone or redone. If the transaction is an undo type of transaction then sufficient information, such as locations and values of store operations, is stored in log entries so that the application can be restored to a state before the transaction occurred and thus before any failure that may have occurred. If the transaction is a redo transaction then sufficient information is stored in the log, such as locations and values of store operations along with a replay function that uses the logged values, so that the application can be advanced to a state after the transaction occurred, that is a state which the application would achieve despite any error that may have occurred. Making portions of the application into failure-atomic transactions makes the application more robust allowing it to recover from a failure, including a power loss.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Certain embodiments may be implemented in a host computer without a hardware abstraction layer or an OS-less container. For example, certain embodiments may be implemented in a host computer running a Linux® or Windows® operating system.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer-readable medium refers to any data storage device that can store data which can thereafter be input to a computer system. Computer readable media may be based on any existing or subsequently developed technology for embodying computer programs in a manner that enables them to be read by a computer. Examples of a computer-readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for rewriting application code as a failure-atomic transaction, the method comprising:
   detecting a portion of application code declared to be a transaction by recognizing in the application code a 'transaction begin' function prior to the portion and a 'transaction end' function after the portion;
   accumulating instructions in the portion of application code into a code fragment;
   rewriting the code fragment of the application code as a failure-atomic transaction, such that the rewritten code fragment includes the 'transaction begin' function, rewritten code which includes code that saves the locations and values of persistent store operations in the application code, and the 'transaction end' function; and
   releasing the rewritten code fragment to the application for execution.

2. The method of claim 1,
   wherein the rewritten code fragment further includes code for writing the locations and values of the persistent store operations to a software log, a write-back function that flushes the values of the persistent store operations to their locations in persistent memory, and code for a commit function; and
   wherein the commit function in the rewritten code fragment is only executed after the write-back function completes.

3. The method of claim 2, wherein the software log is a transaction log.

4. The method of claim 3, wherein the transaction log is stored in the persistent memory.

5. The method of claim 2, wherein the rewritten code fragment includes code that enables an undoing of the transaction to restore the application to a state prior to a failure.

6. The method of claim 2, wherein the rewritten code fragment includes code that enables a redoing of the transaction to advance the application to a state after a failure.

7. The method of claim 6, wherein the rewritten code fragment includes code that saves the values and locations of load operations from the persistent memory in the application code.

8. The method of claim 2, wherein rewriting the code fragment is performed by a binary translator.

9. A non-transitory computer-readable medium containing instructions, which when executed by one or more processors, cause the processors to carry out a method for rewriting application code as a failure-atomic transaction, wherein the method comprises:
   detecting a portion of application code declared to be a transaction by recognizing in the application code a 'transaction begin' function prior to the portion and a 'transaction end' function after the portion;
   accumulating instructions in the portion of application code into a code fragment;
   rewriting the code fragment of the application code as a failure-atomic transaction, such that the rewritten code fragment includes the 'transaction begin' function, rewritten code which includes code that saves the locations and values of persistent store operations in the application code, and the 'transaction end' function; and
   releasing the rewritten code fragment to the application for execution.

10. The non-transitory computer-readable medium of claim 9,
    wherein the rewritten code fragment further includes code for writing the locations and values of the persistent store operations to a software log, a write-back function that flushes the values of the persistent store operations to their locations in persistent memory, and code for a commit function; and
    wherein the commit function in the rewritten code fragment is only executed after the write-back function completes.

11. The non-transitory computer-readable medium of claim 10, wherein the software log is a transaction log.

12. The non-transitory computer-readable medium of claim 11, wherein the transaction log is stored in the persistent memory.

13. The non-transitory computer-readable medium of claim 10, wherein the rewritten code fragment includes code that enables an undoing of the transaction to restore the application to a state prior to a failure.

14. The non-transitory computer-readable medium of claim 10, wherein the rewritten code fragment includes code that enables a redoing of the transaction to advance the application to a state after a failure.

15. The non-transitory computer-readable medium of claim 14, wherein the rewritten code fragment includes code that saves the values and locations of load operations from the persistent memory in the application code.

16. The non-transitory computer-readable medium of claim 10, wherein rewriting the code fragment is performed by a binary translator.

17. A computing system comprising:
a processor running an application and an operating system that includes a module that modifies code of the application;
a volatile memory coupled to the processor and containing the code of the application; and
a persistent memory coupled to the processor;
wherein the module is configured to:
  detect a portion of application code declared to be a transaction by recognizing in the application code a 'transaction begin' function prior to the portion and a 'transaction end' function after the portion;
  accumulate instructions in the portion of application code into a code fragment;
  rewrite the code fragment of the application code as a failure-atomic transaction, such that the rewritten code fragment includes the 'transaction begin' function, rewritten code which includes code that saves the locations and values of store operations to the persistent memory in the application code, and the 'transaction end' function; and
  release the rewritten code fragment to the application for execution.

18. The computing system of claim 17,
wherein the rewritten code fragment further includes code for writing the locations and values of the persistent store operations to a software log, a write-back function that flushes the values of the persistent store operations to their locations in the persistent memory, and code for a commit function; and
wherein the commit function in the rewritten code fragment is only executed after the write-back function completes.

19. The computing system of claim 18, wherein the persistent memory includes the software log.

20. The computing system of claim 18, wherein the rewritten code fragment includes code that enables an undoing of the transaction to restore the application to a state prior to a failure.

21. The computing system of claim 18, wherein the rewritten code fragment includes code that enables a redoing of the transaction to advance the application to a state after a failure.

22. The computing system of claim 21, wherein the rewritten code fragment includes code that saves the values and locations of persistent load operations in the application code.

23. The computing system of claim 18, wherein the module is a binary translator.

* * * * *